INVENTORS.
ROBERT H. DECKER.
WILLIAM R. HARTER.
BY Alden D. Redfield
Irwin P. Garfinkle
ATTORNEYS.

INVENTORS.
ROBERT H. DECKER.
WILLIAM R. HARTER.
BY Alden D. Redfield
Irwin P. Garfinkle
ATTORNEYS.

Jan. 19, 1960 R. H. DECKER ET AL 2,922,043

TUNER ASSEMBLY

Filed April 9, 1958 4 Sheets-Sheet 3

INVENTORS.
ROBERT H. DECKER.
WILLIAM R. HARTER.
BY Alden D. Redfield
Irwin P. Garfinkle
ATTORNEYS.

Jan. 19, 1960 R. H. DECKER ET AL 2,922,043

TUNER ASSEMBLY

Filed April 9, 1958 4 Sheets-Sheet 4

INVENTORS.
ROBERT H. DECKER.
BY WILLIAM R. HARTER.
Alden D. Redfield
Irwin P. Garfinkle
ATTORNEYS.

2,922,043

TUNER ASSEMBLY

Robert H. Decker and William R. Harter, Cincinnati, Ohio, assignors to Avco Manufacturing Corporation, Cincinnati, Ohio, a corporation of Delaware Application April 9, 1958, Serial No. 727,419

6 Claims. (Cl. 250—40)

This invention relates to tuner assemblies generally and, more particularly, to a very high frequency multistage tuner employing plug-in type modular subassemblies.

Many efforts have been made in the prior art to produce a tuner which would be simple in construction and readily adaptable for mass production techniques and, at the same time, provide ease of maintenance. Generally, this effort resulted in greatly over-simplified tuners, the performance and operating characteristics of which were inferior and generally not acceptable. The problem is particularly acute in complex equipment required for military, aircraft, vehicular and other specialized applications.

A broad object of this invention is to improve the existing design of tuners for radio receivers through improved circuit components and methods of construction.

A primary object of this invention is to overcome the deficiencies of the prior art tuners by providing a modular plug-in type tuner employing printed circuit techniques, and which may be mass-produced and serviced economically.

Another object of this invention is to provide a tuner embracing radio frequency circuitry fixedly located with short leads and low but constant stray capacitance, and which exhibits performance equal to or exceeding the best tuners employing conventional wiring known in the prior art.

Still another object of this invention is to provide a tuner assembly incorporating plug-in type modular subassemblies which are mechanically rugged and self-protecting, the tuning elements of which are all operable from a common drive element.

Another object of this invention is to provide a continuous tuner incorporating plug-in type modular subassemblies that afford means for rapid disassembly and reassembly for ease and speed of corrective maintenance by unskilled or semi-skilled technicians.

Still another object of this invention is to provide a continuous tuner incorporating printed circuit plug-in type modular subassemblies wherein are provided excellent interstage shielding, and circuit isolation free of damaging feedbacks.

Briefly stated, the foregoing objects are accomplished by means of a plurality of printed circuit boards on each of which are mounted the components of an entire stage of a very high frequency tuner of a type having continuous tuning elements. The printed circuit boards are separably connected in tandem by means of banana plugs to form a unitary tuner assembly. The unitary tuner assembly is then supported from a frame which carries a first captive or axially constrained shaft for operating the continuous inductance tuning elements located in several of the stages, and a second captive or axially constrained shaft for operating a plurality of similarly located band selector switches. The components on each of the modules are provided with metal shields which serve to electrically shield and isolate the various stages and, in addition, the shields provide protection for the components of the stage when modules are separated from the tuner assembly. The entire tuner is provided with a metallic cover provided with heat-dissipating means for the vacuum tubes in the various stages, and with a plurality of apertures permitting access to various components.

For a more comprehensive understanding of the further objects and nature of this invention, reference should now be made to the following detailed description and to the accompanying drawings, in which.

Figure 7:
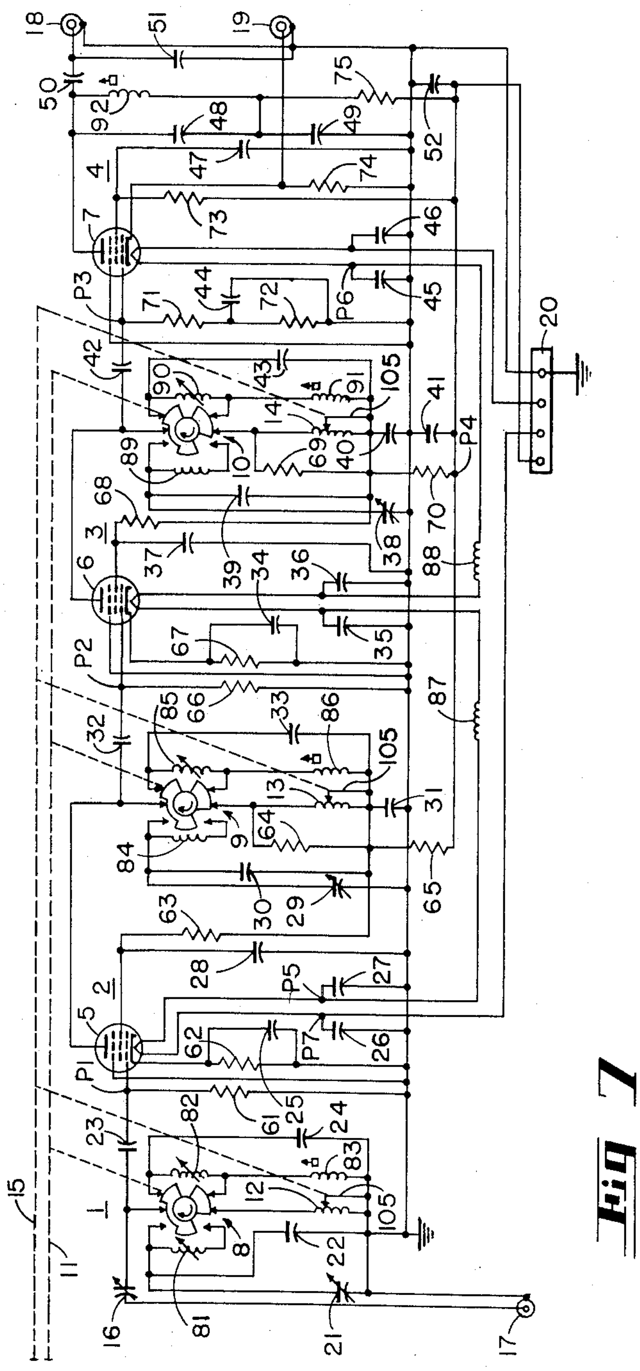
Fig. 7 is an electrical schematic diagram of a preferred embodiment of the tuner showing the electronic relationship of the various components.

For an over-all presentation of the preferred embodiment of our invention, attention is first directed to Fig. 7 of the drawings, wherein is shown schematically a complete four-stage radio frequency tuner having an antenna stage 1, a first radio frequency amplifier stage 2, a second radio frequency amplifier stage 3 and a mixer stage 4. Although transistors or other electronic devices may be used, the preferred embodiment includes pentodes 5, 6 and 7 in the amplifier stages 2 and 3 and in the mixer stage 4, respectively. Bandswitches 8, 9 and 10 are included in the first three stages, respectively, for providing operation in two frequency bands, and all are driven from a common bandswitch shaft 11. Moreover, the output from each of the first three stages is continuously tunable over the entire range of each band by means of continuously tuned inductors 12, 13 and 14, all of which are simultaneously driven from a common tuning shaft 15.

The input circuit to the antenna stage 1 may be coupled to a conventional antenna through a variable condenser 16 connected by means of a jack 17. The output from the mixer stage 4 is taken from a jack 18 and amplified in a suitable intermediate frequency amplifier. The beat frequency input to the mixer is applied from an oscillator through the jack 19. The antenna, intermediate frequency amplifier and oscillator do not form a part of this invention and are not illustrated, and any suitable conventional circuitry may be employed. Direct current potentials are applied to the plate, screen grid and heater circuits of the pentodes from a plug 20 connected to suitable sources of supply.

The remaining circuit components are listed below and are conventional, functioning in a manner well known in the art. While the precise arrangement illustrated and the actual circuit parameters used do not form a part of the present invention, the parameters used in a successful receiver embodying our invention are included as an aid to persons skilled in the art:

Condensers:

| | |
|---|---|
| **16** | Variable from 2.1–12.9 $\mu\mu$f. |
| **21** | Variable from 0.5–8.5 $\mu\mu$f. |
| **22** | 47 $\mu\mu$f. |
| **23** | 47 $\mu\mu$f. |
| **24** | 4 $\mu\mu$f. |
| **25** | 800 $\mu\mu$f. |
| **26** | 800 $\mu\mu$f. |

Condensers:—*Continued*

| | |
|---|---|
| 27 | 800 $\mu\mu$f. |
| 28 | 800 $\mu\mu$f. |
| 29 | Variable from 0.5–8.5 $\mu\mu$f. |
| 30 | 51 $\mu\mu$f. |
| 31 | 3000 $\mu\mu$f. |
| 32 | 47 $\mu\mu$f. |
| 33 | 2 $\mu\mu$f. |
| 34 | 800 $\mu\mu$f. |
| 35 | 800 $\mu\mu$f. |
| 36 | 800 $\mu\mu$f. |
| 37 | 800 $\mu\mu$f. |
| 38 | Variable from 0.5–8.5 $\mu\mu$f. |
| 39 | 51 $\mu\mu$f. |
| 40 | 3000 $\mu\mu$f. |
| 41 | 800 $\mu\mu$f. |
| 42 | 47 $\mu\mu$f. |
| 43 | 2 $\mu\mu$f. |
| 44 | 800 $\mu\mu$f. |
| 45 | 800 $\mu\mu$f. |
| 46 | 800 $\mu\mu$f. |
| 47 | 2000 $\mu\mu$f. |
| 48 | 22 $\mu\mu$f. |
| 49 | 2000 $\mu\mu$f. |
| 50 | 30 $\mu\mu$f. |
| 51 | 450 $\mu\mu$f. |
| 52 | 800 $\mu\mu$f. |

Resistors:

| | |
|---|---|
| 61 | 470K ohms. |
| 62 | 560 ohms. |
| 63 | 1000 ohms. |
| 64 | 5600 ohms. |
| 65 | 680 ohms. |
| 66 | 470K ohms. |
| 67 | 560 ohms. |
| 68 | 1000 ohms. |
| 69 | 5600 ohms. |
| 70 | 680 ohms. |
| 71 | 220K ohms. |
| 72 | 220K ohms. |
| 73 | 180K ohms. |
| 74 | 68 ohms. |
| 75 | 39K ohms. |

Inductors:

| | |
|---|---|
| 12 | Variable from .025–.713 mh. |
| 13 | Variable from .025–.713 mh. |
| 14 | Variable from .025–.713 mh. |
| 81 | 0.15 mh. |
| 82 | 0.24 mh. |
| 83 | 0.9 mh. |
| 84 | 0.15 mh. |
| 85 | 0.24 mh. |
| 86 | 0.9 mh. |
| 87 | 1.2 mh. |
| 88 | 1.2 mh. |
| 89 | 0.15 mh. |
| 90 | 0.24 mh. |
| 91 | 0.9 mh. |
| 92 | 2.7 mh. |

Vacuum tubes: Pentodes 5, 6, 7—Type 6205.

As previously indicated, the several stages are individually mounted on printed circuit boards which are plugged together to form a unitary tuner assembly. The structural arrangement of the tuner assembly is illustrated in Figs. 1–6 and, where not impractical, the individual circuit components of each stage have been illustrated, and the reference characters applied in Figs. 1–6 correspond with those used to designate the same components schematically represented in Fig. 7. The various circuit components of each of the stages 1–4 are mounted on printed circuit boards 101–104, respectively. Each printed circuit board is molded from an inflexible and rugged plastic insulating material provided with a suitable spiral groove for receiving the windings of the continuous tuning elements 12, 13 and 14 which are permanently mounted on the printed circuit boards 101, 102 and 103, respectively, and are made integral therewith. This type of element is illustrated in United States Patent No. 2,694,150 issued to Emmery J. H. Bussard on November 9, 1954, and owned by the same assignee as this invention. Each tuning element is provided with a wiper arm 105 mounted, respectively, on rotors 106 (see Fig. 2). The rotors are each held captive on their respective printed circuit boards and are centrally apertured and aligned for receiving the tuning shaft 15 (see Fig. 4). For providing a driving engagement between the shaft and the rotors, the apertures and the shaft are provided with corresponding flat portions.

Figures 2, 3:
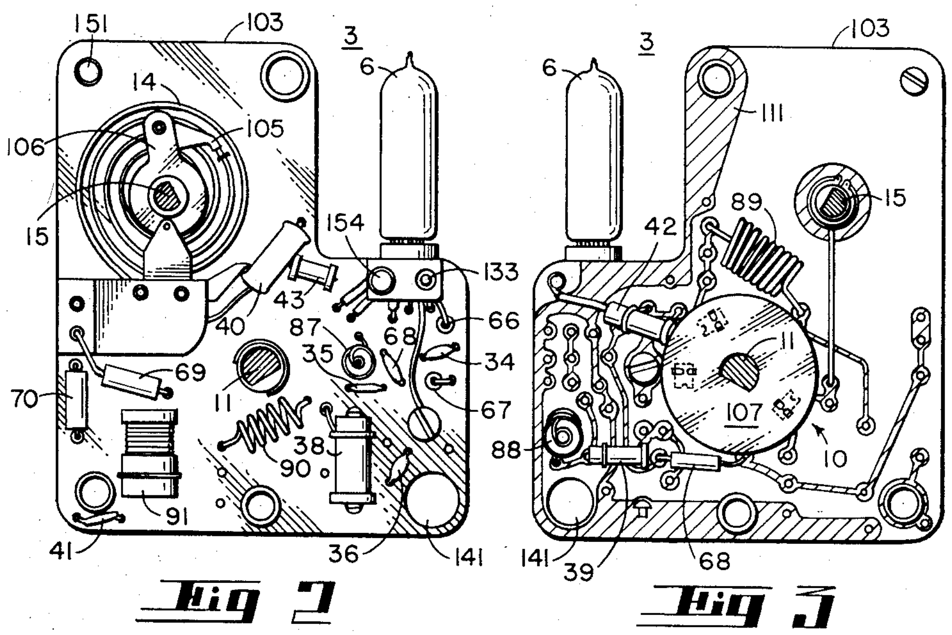
Fig. 2 is a plan view of a typical printed circuit board and the components thereof.
Fig. 3 is a plan view of the typical printed circuit board illustrated in Fig. 2, but viewed from the opposite side.
Figure 4:
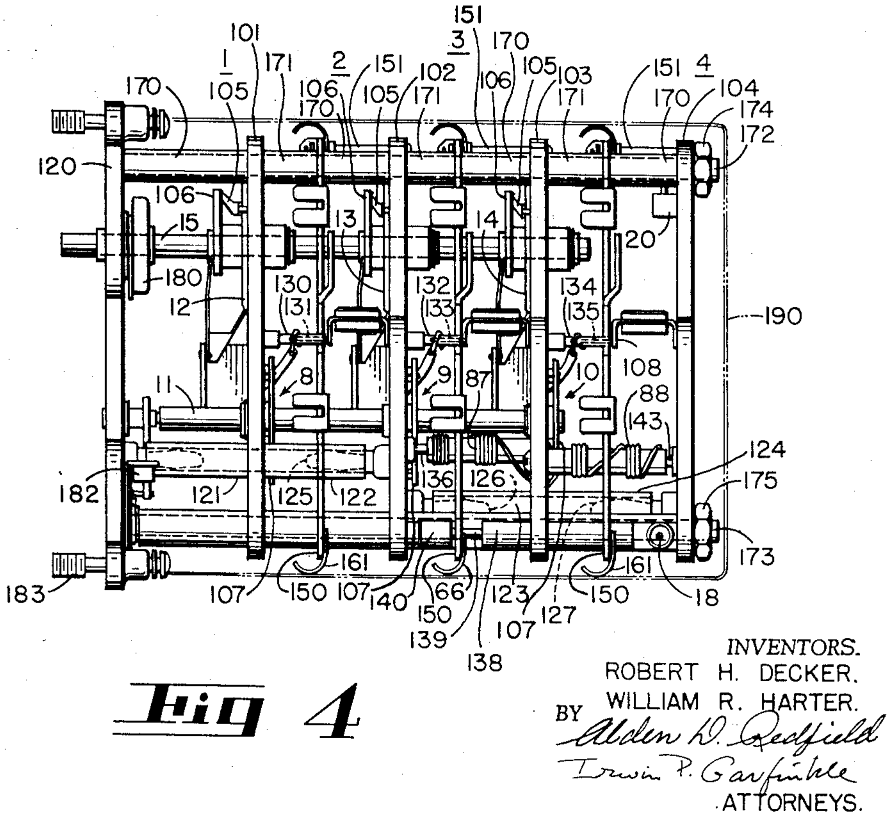
Fig. 4 is a side elevation of the entire assembly with most of the components removed.

On the opposite side of the printed circuit boards 101, 102 and 103 are mounted the bandswitches 8, 9 and 10, respectively (see Figs. 3 and 4). For carrying the bandswitch taps, each bandswitch is provided with a disc-shaped rotor 107 which is held captive on its respective printed circuit board. The rotors are centrally apertured and aligned for receiving the common bandswitch shaft 11, the aperture and the shaft each having corresponding flat portions.

For mounting the pentodes 5, 6 and 7, inverted U-shaped brackets 108 are secured on each of the printed circuit insulating boards 102, 103 and 104, and a bracket 109 is provided on the printed circuit board 101 for suitably mounting the variable condenser 16, which may be driven from a remote point by a flexible shaft 110. Of course, the brackets 108 can also be used for mounting a transistor or other electronic device. For a purpose which will hereinafter be apparent, the brackets 108 are mounted adjacent a cutaway portion of their respective printed circuit boards.

As best seen in Figs. 2 and 3, the majority of the electrical interconnections between the components in the respective stages are completed by means of printed circuitry, illustrated at 111, deposited on each printed circuit board.

As previously indicated, each printed circuit insulating board is provided with plug-in means for mechanically connecting the stages in tandem to form a unitary tuner assembly and for electrically connecting the various stages. In addition, means are also provided for securing the tuner assembly to a frame 120. For the primary mechanical connections, the printed circuit boards 101 and 103 are provided, respectively, with plug-receiving posts 121, 122 and 123, 124 extending from both sides thereof. Cooperating therewith and mounted on both sides of the board 102 and on one side of the board 104 are banana plugs 125, 126 and 127, respectively. The cooperative engagement between the plug-receiving posts and the banana plugs provide the primary means for maintaining the several stages connected in tandem when disassociated from the frame 120 but, as will be seen, the separable electrical interconnections among the various stages provide additional mechanical support. Moreover, certain electrical connections are completed through the posts and plugs.

As seen in Fig. 7, electrical interconnections among the various stages are required at points $P_1$ to $P_7$ among the various stages. The connections to establish point $P_1$ include a sleeve-type female plug 130 rigidly secured to the board 101 and electrically connected to the condenser 23. Mechanically and electrically cooperating therewith and mounted on the bracket 108 on board 102 is a male pin 131 electrically connected to the control grid of pentode 5. Thus, when the first and second stages are plugged together, the electrical connection is established at point $P_1$.

Similarly, for electrically interconnecting stages 2 and 3 at the point $P_2$ we provide a female sleeve 132 rigidly mounted on the printed circuit board 102 and on corresponding male pin 133 rigidly secured to the bracket 108 on board 103. The sleeve 132 is electrically connected to the condenser 32 while the pin 133 is electrically connected to the control grid of pentode 6 and, thus, when the stages 2 and 3 are plugged together the electrical connection is completed at the point $P_2$. For establishing the point $P_3$, a sleeve 134 is similarly mounted on the board 103 while a pin 135 is secured to the bracket 108 of board 104, the sleeve 134 being electrically connected to condenser 42 and the pin 135 being electrically connected to the control grid of pentode 7.

For establishing point $P_4$ which is common to stages 2, 3 and 4, electrical as well as mechanical connections are made through the posts 123 and 124 and the banana plugs 126 and 127. The pin 126 is connected to the resistor 65, and the sleeve 123 is connected to the resistor 70, thus electrically interconnecting the second and third stages. Moreover, the plug 127 is electrically connected to the resistor 75 and the sleeve 124 is electrically connected to the resistor 70, thus electrically interconnecting the third and fourth stages and establishing point $P_4$.

For establishing the connection at point $P_5$ which is common to stages 2 and 3, we mount on the printed circuit board 102 a pin 136 and on board 103, in a position corresponding therewith, the inductor 87 having a hollowed central sleeve 137 for receiving the pin 136. Since the pin 136 is electrically connected to the heater of pentode 5 and the sleeve 137 is electrically connected to the inductor 87 which, in turn, is connected to the heater of pentode 6, the second and third stage will be electrically interconnected through inductor 87 when the mechanical correction is established.

For establishing the connection at point $P_6$ which is common to stages 3 and 4, we mount on the printed circuit board 104 a pin 143 and, on board 103 in a position corresponding therewith, the inductor 88 having a hollowed central sleeve 144 for receiving the pin 143. The pin 143 is electrically connected to the heater of pentode 7, and the sleeve is electrically connected to the inductor 88 which, in turn, is connected to the heater of pentode 6 and, thus, the third and fourth stages are electrically interconnected through inductor 88 when the mechanical connection is made.

To complete the connection at point $P_7$ a hollow post 138 carrying a pin 139 which is insulated therefrom, is rigidly secured to the board 104. A conductive sleeve 140 for receiving the pin 139 is rigidly mounted on the board 102 and, to permit the interconnection, a circular aperture 141 corresponding in size to the diameter of the post 138 is provided in the board 103. The conductive sleeve 140 is electrically connected to the heater of pentode 5 while the pin 139 is electrically connected to the power input connector 20 on board 104, thereby establishing the final connection at point $P_7$.

Figure 1:
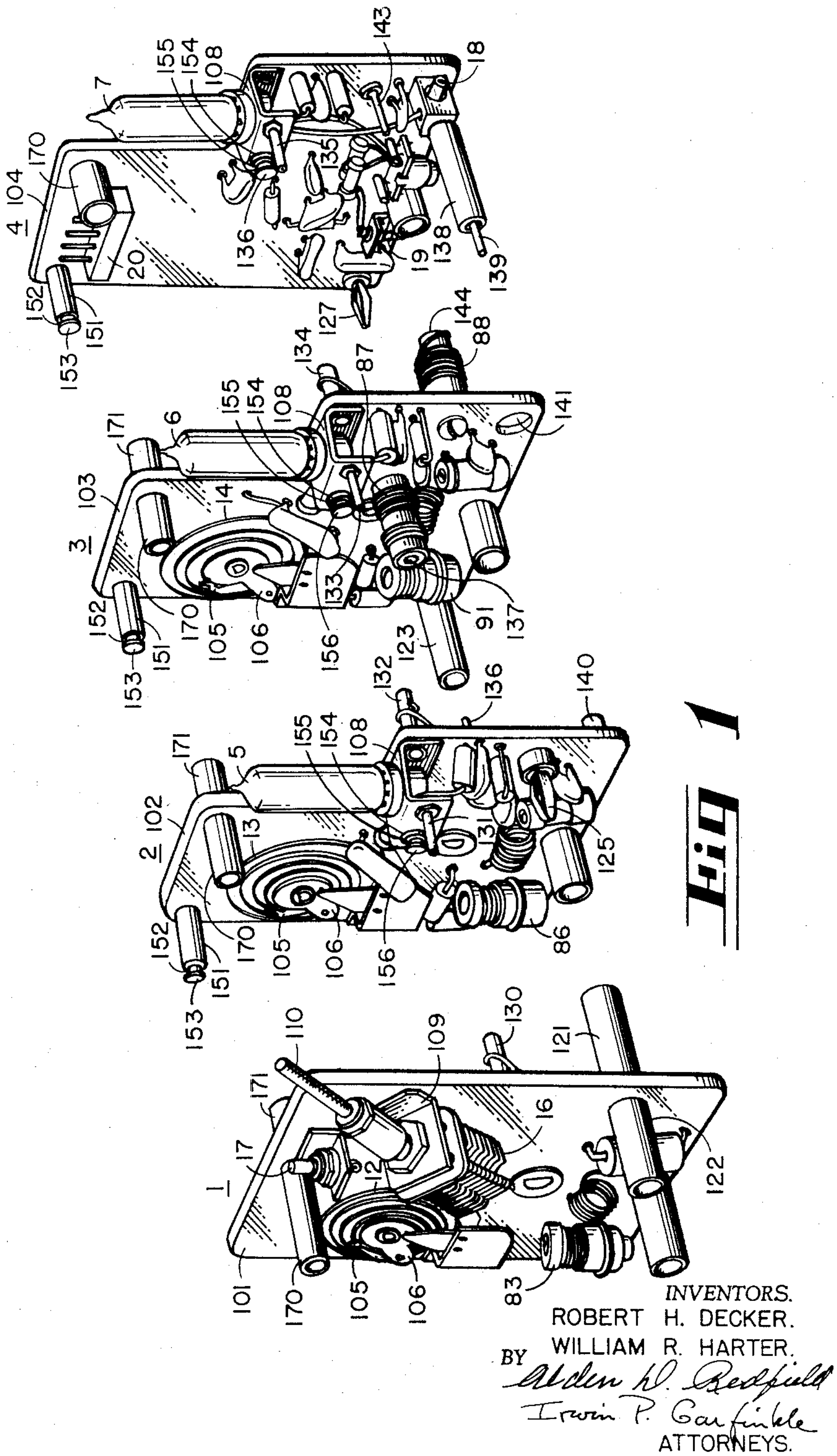
Fig. 1 is an exploded perspective view showing the modular subassemblies of the tuner.

In order to provide interstage shielding and static isolation, and for the further purpose of protecting the various components from rough handling when the stages are separated, we provide a metallic shield 150 for each of the printed circuit boards 102, 103 and 104. As best seen in Fig. 1, a convenient mounting for each of the shields on its respective printed circuit board is provided by means of a rigidly secured post 151 having a clip-receiving groove 152 and an abutment 153, and by means of a mounting member 154 rigidly secured on each of the brackets 108 and having a similar clip-receiving groove 155 and an abutment 156. The shields are provided with apertures 157 and 158 in positions cooperating with the posts 151 and members 154 and, when in place, the shields are supported on the abutments 153 and 156, respectively. For locking the shields in position, we provide slide clips 159 and 160 which are adapted to ride and lock within the grooves 152 and 155, respectively. For a purpose hereinafter to be described, curved spring fingers 161 are secured to the edges of each of the metallic shields 150. The shape of each of the shields 150 corresponds generally to the shape of its printed circuit board, except that each shield is provided with a projection 162 in a position corresponding with its respective pentode for the purpose of providing additional heat dissipation and mechanical protection for said pentodes 5, 6 and 7.

For the purpose of mounting the assembled tuners on the frame 120, the printed circuit boards 101–104 are each provided with sets of aligned abutting sleeves 170 and 171, while the frame 120 is provided with corresponding rods 172 and 173 of a length sufficient to extend through all the sleeves. When in position, nuts 174 and 175 may be applied to the threaded ends of the rods 172 and 173, respectively, to provide a very secure assembly.

The shafts 11 and 15 for driving the bandswitches and inductances, respectively, are rotatably mounted on the frame 120 and are axially constrained or held captive thereon. Thus, when the unitary tuner assembly is removed from the frame 120, the frame, the rods 172 and 173, and the shafts 11 and 15 are maintained as a unitary ensemble.

As may be seen from an inspection of Fig. 2, the construction of the inductors 12, 13 and 14 requires some means for limiting rotation of the shaft 15; for this purpose we mount a conventional turn-stop mechanism 180 on the shaft. For driving the shaft 15 from a remote location, we provide a gear 181 which may be actuated by means of any conventional gear train (not shown). For driving the shaft 11 through the limited degree of revolution required for switching from one point to another, we provide a simple and conventional cam mechanism indicated at 182.

Figure 5:
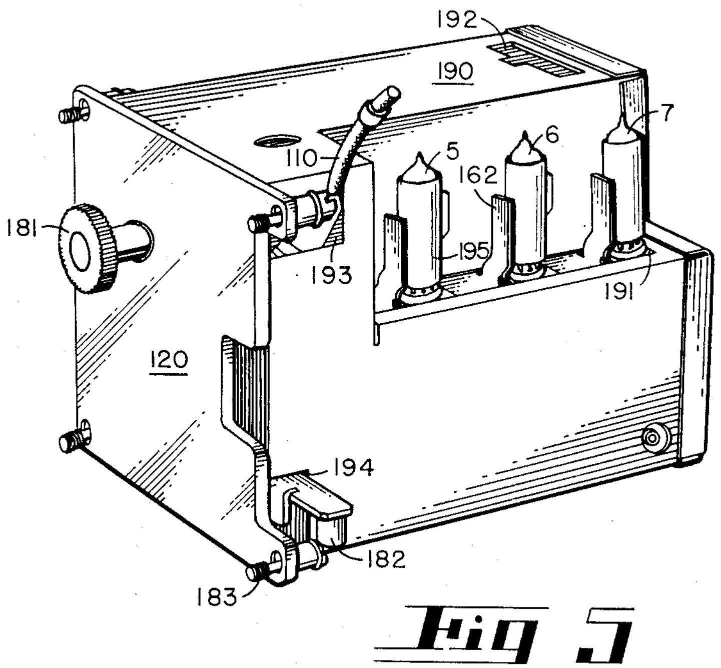
Fig. 5 is a view showing the entire assembly within its metallic protective cover.
Figure 6:
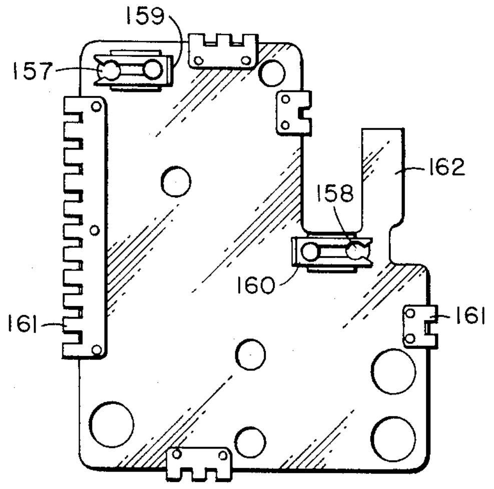
Fig. 6 illustrates a subassembly shield.

Each of the corners of the frame 120 is provided with a captive screw 183 providing convenient means for securing the frame, along with the tuner assembly, to a chassis or other structure. The entire tuning assembly may then be enclosed by a cover 190 which is securely held in place by means of the frictional contact between the inside of the cover and the spring fingers 161. As best seen in Fig. 5, the dimensions of the cover 190 correspond generally to the shape of the printed circuit boards 101–104, and in the area corresponding to the cutaway portions of the printed circuit boards 102, 103 and 104 is provided a slot 191 for permitting the cover to be slid over the assembly while at the same time exposing the pentodes 5, 6 and 7. Other slots and apertures are also provided, as at 192, 193 and 194 for permitting access to the plug 20, the condenser 16 and the cam mechanism 182, respectively, as well as at various other locations for providing access to the jacks 17, 18 and 19 and to the several slug-tuned inductors. For additional shielding, as well as heat dissipation, a silver-plated shield 195 may be provided, as shown, for each of the pentodes 5, 6 and 7.

From the foregoing description, it is apparent that many modifications may be made to the preferred embodiment of our invention without departing from the spirit thereof. For this reason it is our intention that our invention be limited only by the appended claims when read in the light of the prior art.

What we claim is:

1. In a radio frequency tuner, the combination comprising: an antenna stage, a first radio frequency amplifier stage, a second radio frequency amplifier stage and a mixer stage, each of said stages including an insulating board having a plurality of electronic components mounted thereon, said components being electrically interconnected for functional operation of each of said stages; a plurality of plug-in type connectors on each of said insulating boards for electrically interconnecting said stages and for mechanically interconnecting said insulating boards in spaced parallel relationship to form a unitary assembly; said plurality of components including a continuous inductance tuning element mounted on each of said boards in said antenna stage, said first radio frequency amplifier stage, and said second radio frequency amplifier stage, each of said continuous inductance tuning elements comprising a spiral winding; a movable tap electrically connected to said electronic components in a respective stage, said tap engaging said spiral winding; an axially constrained rotor for moving said tap along said spiral winding, said rotor being mounted on said board for rotation on an axis perpendicular thereto; a first shaft for simultaneously driving all of said rotors, each of said rotors having an aperture, said apertures being aligned for receiving said first shaft; said electronic components of said antenna stage, said first radio frequency amplifier stage and said second radio frequency amplifier stage each also including a bandswitch having fixed contacts mounted on a respective board, and an axially constrained rotor mounted on said boards for rotation on an axis perpendicular thereto, each of said rotors having contacts cooperating with respective fixed contacts, and each of said rotors being centrally apertured and aligned for receiving said second shaft; and a frame for supporting said unitary assembly and for mounting each of said first and second shafts for rotation on an axis perpendicular to said boards, said shafts being axially constrained on said frame.

2. The invention as defined in claim 1 and a metallic plate mounted on each of said boards in spaced parallel relation thereto, the majority of components in each of said stages being positioned in the space between said board and said metallic plate, said metallic plate thereby providing electrostatic shielding between said stages, and mechanical protection of the components of the respective stages.

3. The invention as defined in claim 2 wherein the dimensions of said metallic plate are approximately equal to the dimensions of the respective boards and wherein are mounted on said plates a plurality of spring fingers; and a metallic casing enclosing said unitary arranged assembly and maintained in position by frictional engagement with said spring fingers.

4. In a radio frequency tuner, the combination comprising: a plurality of radio frequency stages, each of said stages comprising a plurality of components mounted on an insulating board, said components in each of said stages being electrically interconnected for functional operation of the respective stages; a plurality of plug-in type connectors on each of said insulating boards for electrically interconnecting said stages and for mechanically interconnecting said insulating boards in spaced parallel relationship to form a unitary separable assembly; said components in each of a plurality of said stages including independently adjustable tuning elements, and also including a flat spiral inductance winding; a movable tap for each of said flat spiral windings, each of said movable taps electrically contacting said flat spiral winding and electrically interconnected with said electronic components in a respective stage; an axially constrained rotor for moving said tap along said winding, said rotor being mounted on a respective board for rotation on an axis perpendicular to said board; a frame for supporting said unitary assembly; and a rotatable shaft for simultaneously driving all of said rotors, said shaft being axially constrained on said frame.

5. The invention as defined in claim 4 and a metallic plate mounted on each of said boards in spaced perpendicular relation thereto, the majority of components in each of said stages being positioned between said boards and said metallic plate, said metallic plate thereby providing electrostatic shielding between said stages and mechanical protection of the components of the respective stages.

6. The invention as defined in claim 5 wherein the dimensions of said metallic plate are approximately equal to the dimensions of the respective boards, and wherein are mounted on said plates a plurality of spring fingers; and a metallic enclosure housing said unitary assembly and maintained in position by frictional engagement with said spring fingers, said cover having apertures permitting access to certain of said components.

References Cited in the file of this patent

UNITED STATES PATENTS

| | | |
|---|---|---|
| 2,268,619 | Reid | Jan. 6, 1942 |
| 2,694,150 | Bussard | Nov. 9, 1954 |

FOREIGN PATENTS

| | | |
|---|---|---|
| 697,068 | Great Britain | Sept. 16, 1953 |